(No Model.)

J. C. NICHOL.
AXLE LUBRICATOR.

No. 338,287. Patented Mar. 23, 1886.

Witnesses:
Olden H. Evans
Alex. W. Dow

Inventor
John Christopher Nichol
Per Attys:—
Reynolds & Kellow

UNITED STATES PATENT OFFICE.

JOHN CHRISTOPHER NICHOL, OF MONTREAL, QUEBEC, CANADA.

AXLE-LUBRICATOR.

SPECIFICATION forming part of Letters Patent No. 338,287, dated March 23, 1886.

Application filed November 21, 1885. Serial No. 183,572. (No model.)

*To all whom it may concern:*

Be it known that I, JOHN CHRISTOPHER NICHOL, of the city of Montreal, in the District of Montreal and Province of Quebec, Canada, have invented certain new and useful Improvements in Axle-Lubricators; and I do hereby declare that the following is a full, clear, and exact description of the same.

My invention relates to devices for lubricating purposes, and provides one which can be placed in any ordinary axle-box through the usual opening, and will bring the lubricant in constant contact with the axle, the supply increasing with the speed of rotation. It may be thus described: Into the axle-box I slip a frame, on which are formed bearings for a spindle on which is mounted a disk, preferably, with a periphery of bristly or fibrous material. This spindle is rotated by the axle itself by means of a flexible connection attached at one end to it, and at the other end to a short spindle projecting from the other end of the axle or equivalent device.

For full comprehension of the invention reference must be had to the annexed drawings, forming part of this specification, in which—

Figure 2:
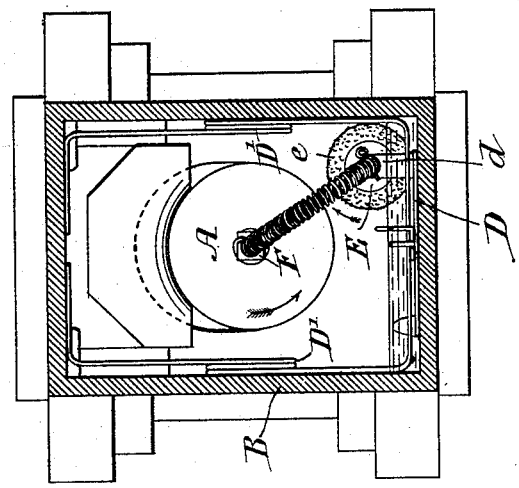
Figure 1:
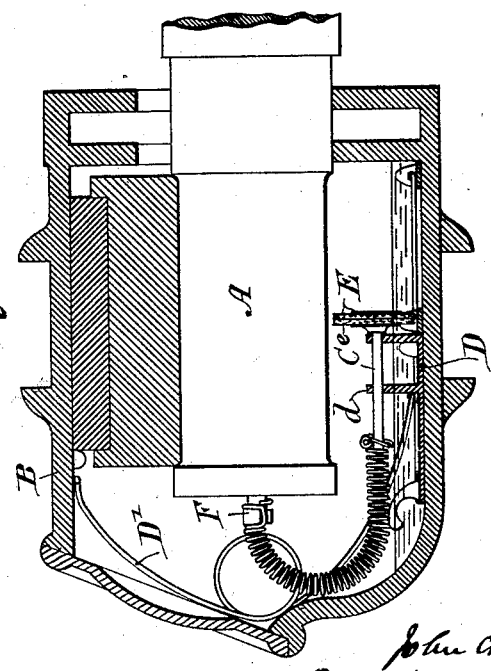

Figure 1 is a side view, and Fig. 2 a front view, both taken through the axle-box, of the invention.

Similar letters of reference indicate like parts.

A is the axle proper, and B the axle-box, both of the ordinary construction.

C is a spindle carried in bearings $d$, formed on a frame, D, slipped into and resting on the bottom of the box and held in place by any suitable means, such as the springs D' shown in the drawings, or a flange on the frame itself, pressing against a shoulder on the end of the axle.

E is a disk mounted rigidly on the spindle C and having its periphery formed, by preference, of fibrous or bristly material, $e$.

F is a spindle or pin set into the end of the axle in any usual way. The ends of this spindle or pin F and of the spindle C are connected together by a bent flexible connection secured to each by a clip and pin, or by any other equivalent means. This flexible connection is shown as being composed of a tightly-coiled spiral spring; but it may be formed of other suitable material—such as a length of hard rubber, &c.—and its attachment to the axle may be effected by a hollow nut bored into it, or other suitable means, instead of the spindle F. It will thus be seen that the rotation of the axle imparts similar rotary movement to the spindle C and the disk E, which, dipping into the oil contained in the bottom of the box, sprays it onto the surface of the axle, the amount of lubrication being proportionate to the speed of rotation, any usual and approved guard preventing the lubricant from passing out of the box.

The disk may in some cases be made entirely of metal, instead of having a fibrous or bristly periphery.

Although I have shown and described the spindle C as so arranged with reference to the axle that the disk E is at some little distance from it, it must be understood that I do not confine myself to this, as the disk may, if desired, be brought actually in contact with the axle itself.

Having thus described my invention, I beg to state that what I claim is as follows:

An axle-lubricator consisting of a disk mounted on a spindle carried on a plate set in the bottom of the axle-box and rotated by the axle proper through a flexible connection, all substantially as herein set forth.

JOHN CHRISTOPHER NICHOL.

Witnesses:
OWEN M. EVANS,
ALEX. W. DOW.